United States Patent [19]
Wada et al.

[11] Patent Number: 5,568,573
[45] Date of Patent: Oct. 22, 1996

[54] APPARATUS FOR SIMULTANEOUSLY READING IMAGE DATA PRINTED ON BOTH SIDES OF A DOCUMENT

[75] Inventors: Minoru Wada; Norio Kanemitsu, both of Kawasaki, Japan

[73] Assignee: Fujitsu Limited, Kawasaki, Japan

[21] Appl. No.: 285,746

[22] Filed: Aug. 4, 1994

[30] Foreign Application Priority Data

Aug. 6, 1993 [JP] Japan ..................................... 5-195676

[51] Int. Cl.⁶ ..................................................... G06K 7/015
[52] U.S. Cl. .............................. 382/317; 358/449; 355/23
[58] Field of Search ..................................... 358/474, 449, 358/453, 486, 488, 494, 496, 497, 498, 406; 355/311, 23, 24, 75; 382/317, 135, 318; 271/265.01, 265.02, 259

[56] References Cited

U.S. PATENT DOCUMENTS

| | | | |
|---|---|---|---|
| 4,763,160 | 8/1988 | Honjo | 355/311 |
| 4,949,189 | 8/1990 | Ohmori | 358/474 |
| 5,414,522 | 5/1995 | Moriya | 358/449 |

Primary Examiner—Michael T. Razavi
Assistant Examiner—Larry J. Prikockis
Attorney, Agent, or Firm—Armstrong, Westerman, Hattori, McLeland & Naughton

[57] ABSTRACT

A reading apparatus serving as an input means for simultaneously reading printed image information from both the front and back of a document, converting the read information into digital data, and storing the digital data on a data recording medium, such as an optical disk, comprises document carrier mechanisms, a front reading sensor, a back reading sensor, a front size determining sensor, a back size determining sensor, a document size comparator, and a reading control circuit. These components are incorporated in the reading apparatus. The document carrier mechanisms carry documents inserted through a slot through the apparatus and eject them through an outlet. The front data reading sensor and back data reading sensor read printed images from the front and back of a document. The front size determining sensor and back size determining sensor are located upstream of the front data reader in the document carrier path, and detect the sizes of the front and back of a document. The document size comparator compares between the sizes determined by the front size determining sensor and back size determining sensor, and outputs a larger one of determined sizes as the document size. The reading control circuit controls reading of image data from the front and back of a document according to the document size provided by the document size comparator.

6 Claims, 9 Drawing Sheets

APPARATUS FOR SIMULTANEOUSLY READING IMAGE DATA PRINTED ON BOTH SIDES OF A DOCUMENT

BACKGROUND OF THE INVENTION

1. Field of the Invention

The present invention relates to a reading apparatus for simultaneously reading image data printed on both sides of a document. More particularly, this invention is concerned with a reading apparatus, serving as an input means, for simultaneously reading printed image information from both sides of a document storing the read image information on a recording medium such as an optical disk.

2. Description of the Related Art

In recent years, the advance of computer technology has accelerated the trend towards the paperless office where information is stored on recording media including magnetic and optical disk but not on paper. To keep up with this trend towards the paperless office, an input unit, to convert printed information on a document into digital data storable in a recording medium such as an optical disk, is needed. The input unit is available as an image scanner.

To use an image scanner, a document is placed on a glass plate, referred to as a flat bed, a cover is closed, and then a switch is pressed. Light from a light source and an image detecting device is scanned across the bottom of the glass plate, whereby the image data is read. This kind of image scanner makes it necessary to turn over a document printed on both sides of paper to read the entire document. It is therefore slow and inconvenient to read the image data. To improve the image data input rate, there is an increasing demand for a reading apparatus capable of reading printed image data from both sides of a document during a single scan.

In general, this kind of reading apparatus has a built-in automatic carrier mechanism. In the middle of the automatic carrier mechanism, a front data reader for reading the front of a document and a back data reader for reading the back of the document are located. When a document having both sides thereof printed with information is inserted into the reading apparatus, through a slot, the document is carried in the apparatus by means of the carrier mechanism. When the document passes the front data reader, image data is read from the front of the document by means of the surface data reader. Next, when the document passes through the back data reader, image data is read from the back of the document by means of the back data reader. Each of the surface and back data readers has a sensor that detects a leading edge and a trailing edge of a document. When the sensor detects a leading edge of a document, the front data reader or back data reader starts reading the image data. When the sensor detects a trailing edge of the document, the front data reader or back data reader terminates reading.

In the conventional reading apparatus for reading two sides of a document, either of the sensors for detecting the leading and trailing edges of a document may malfunction due to dirt and dust and reduce the detecting efficiency. This results in unstable detection of a trailing edge of a document. When trailing-edge detection for a document becomes unstable, although a trailing edge of a document does not pass the sensor, the sensor recognizes that the document has passed. Before the whole of the document is read, image data reading terminates. In this case, read data is not complete.

SUMMARY OF THE INVENTION

An object of the present invention is to provide a reading apparatus such that even if one of sensors in the front data reader and a back data reader to detect the leading edge and a trailing edge of the document malfunctions, it does not cause any loss of read data.

According to the present invention, a reading apparatus serves as an input means for simultaneously reading printed image information from the front and the back of a document, converting the read information into digital data, and storing the converted information on a data recording medium. The reading apparatus comprises a document carrier means for carrying a document inserted through a slot and ejecting the document through an outlet, a front data reading means for reading a printed image from the front of the document, a back reading means for reading a printed image from the back of the document, a front size determining means lying in a document carrier path to detect the size of the front of the document, a back size determining means lying in the document carrier path to detect the size of the back of the document, a document size comparing means for comparing the sizes of the document detected by the front size determining means and back size determining means, and outputting the larger size as the document size, and a reading control means for allowing the front data reading means and back reading means to read printed image information from the document according to the document size provided by the document size comparing means.

The front size determining means and the back size determining means may be placed in a line along the document carrying direction of the document carrier path. The front size determining means and the back size determining means may be placed side by side across the document carrier path. The document width detecting means may be placed side by side across the document carrier path, so that the reading apparatus can detect the width of the document.

As mentioned above, according to the reading apparatus of the present invention, the sizes of the front and back of a document are measured and compared with each other. The larger size is adopted as a document size. Printed image data on the document will therefore not be missed but the document will be completely read.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Prior to describing the preferred embodiments of the present invention, a conventional reading apparatus will be described in conjunction with FIGS. 1 to 3.

Figure 1:
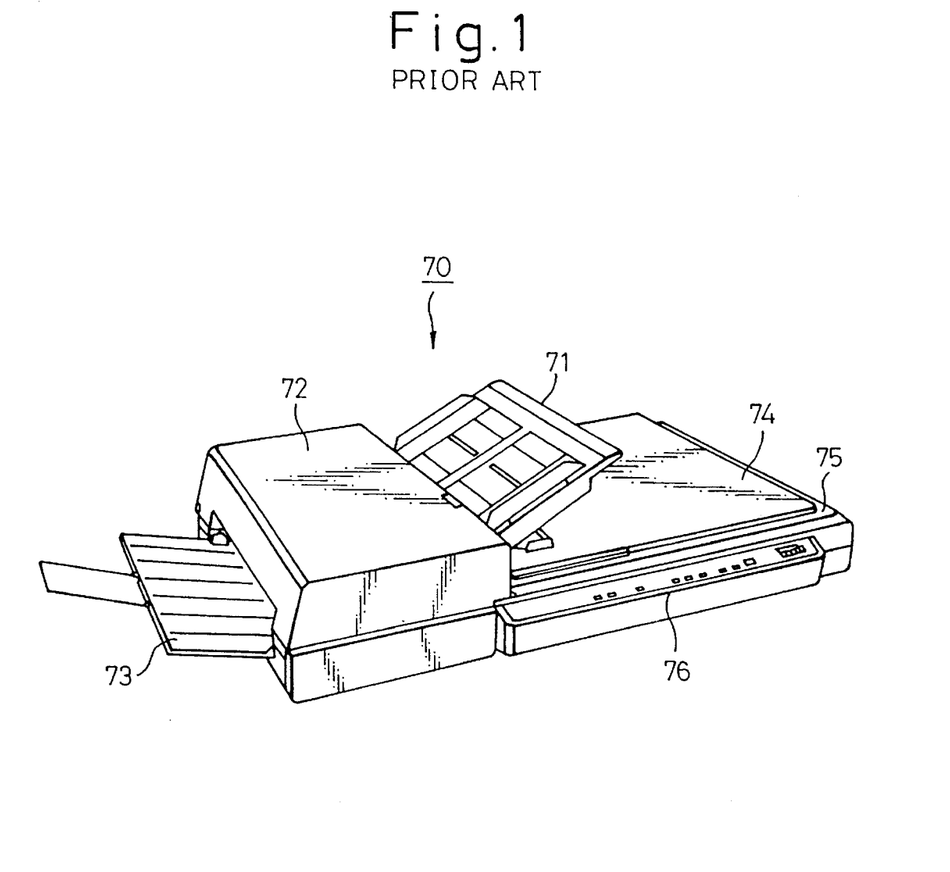
FIG. 1 shows an appearance of the whole of a conventional reading apparatus.

FIG. 1 shows an appearance of a conventional reading apparatus 70. In FIG. 1, reference numerals 71 denotes a chute, 72 denotes an automatic document feeder (ADF), 73 denotes a stacker, 74 denotes a document cover, 75 denotes a flat bed, and 76 denotes an operator panel.

Documents to be read are placed on the chute 71. The documents so placed are fed one by one to the ADF 72. The ADF 72 has a front data reader and a back data reader for reading printed image data from the front and back of a document. The documents having passed through the ADF 72 and having had the image data read from the fronts and backs thereof are ejected to and stacked in the stacker 73.

In addition to the ADF for reading both sides of a document, the reading apparatus 70 shown in FIG. 1 has the flat bed 75 for use in reading image data from a book that cannot pass through the ADF 72 or a document having only one side thereof printed. For reading image data from a book, the document cover 74 is opened, a book is placed on the flat bed 75, and then the document cover 74 is closed. Thereafter, reading is started. The operator panel 76 has a power switch, a start switch, a stop switch, a reading mode switch, a select switch, and other switches which are manipulated by an operator.

Figures 2A, 2B:
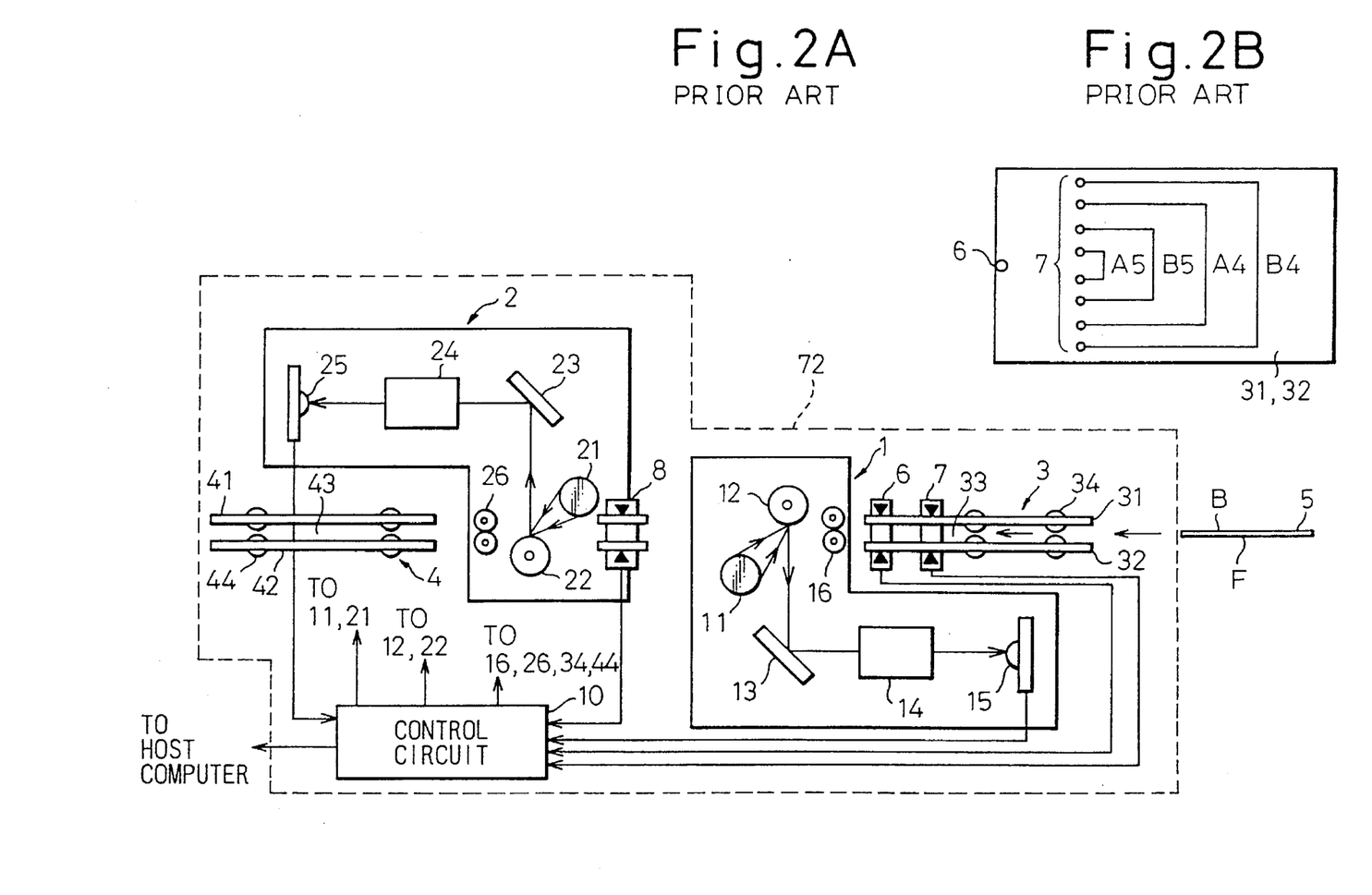
FIG. 2A is a block diagram for explaining components incorporated in the reading apparatus shown in FIG. 1.
FIG. 2B is a plan view showing an example of a layout of document size sensors in the reading apparatus shown in FIG. 2A.

FIG. 2A is a block diagram showing components of the conventional reading apparatus 70 in FIG. 1. In FIG. 2A, reference numeral 1 denotes a front data reader for reading the front of a document. The front data reader 1 comprises a lamp 11 for illuminating a front F of an incoming document 5, a platen 12 for supporting the incoming document 5 so that the document 5 can be illuminated by the lamp 11, a mirror 13 for changing an optical path of light reflected from the passing document 5 supported by the platen 12, a lens 14 for converging light reflected from the mirror 13, and a CCD line sensor 15 for detecting light converged by the lens 14 and producing an electric signal representing an image on the document 5.

In FIG. 2A, reference numeral 2 denotes a back reader for reading the back of a document. The back reader 2 comprises a lamp 21 for illuminating the back B of the incoming document 5, a platen 22 for supporting the incoming document 5 so that the document 5 can be illuminated by the lamp 21, a mirror 23 for changing an optical path of light reflected from the passing document 5 supported by the platen 22, a lens 24 for converging light reflected from the mirror 23, and a CCD line sensor 25 for detecting light converged by the lens 24 and producing an electric signal representing an image on the document 5.

Reference numerals 3 and 4 denote document carrier mechanisms for carrying the document 5. Reference numeral 6 denotes a front top sensor mounted in the document carrier mechanism 3 for detecting a leading edge and a trailing edge of the incoming document 5. Reference numeral 7 denotes document width sensors for detecting the width of the document 5. Reference numeral 8 denotes a back top sensor for detecting the leading edge and the trailing edge of the back of the document 5. The document carrier mechanism 3 or 4 has two guide plates 31 and 32 or 41 and 42. A carrier path 33 or 43 through which the document 5 runs is defined by the two guide plates 31 and 32 or 41 and 42. The document carrier path 33 or 43 has a roller 34 or 44 for feeding the document 5. The document width sensors 7 are placed side by side transversely or perpendicularly to the document carrying path 33 through which the document 5 is carried. The document width sensors 7 detect a width of a document in pairs. For example, when a pair of the sensors 7 located at innermost positions are blocked with a document, the document size is recognized as A5. When all the sensors 7 are blocked with a document, the document size is recognized as B4. Arrows in FIG. 2A indicate a carrying direction of the document 5 in the document carrier path 3.

Figure 3:
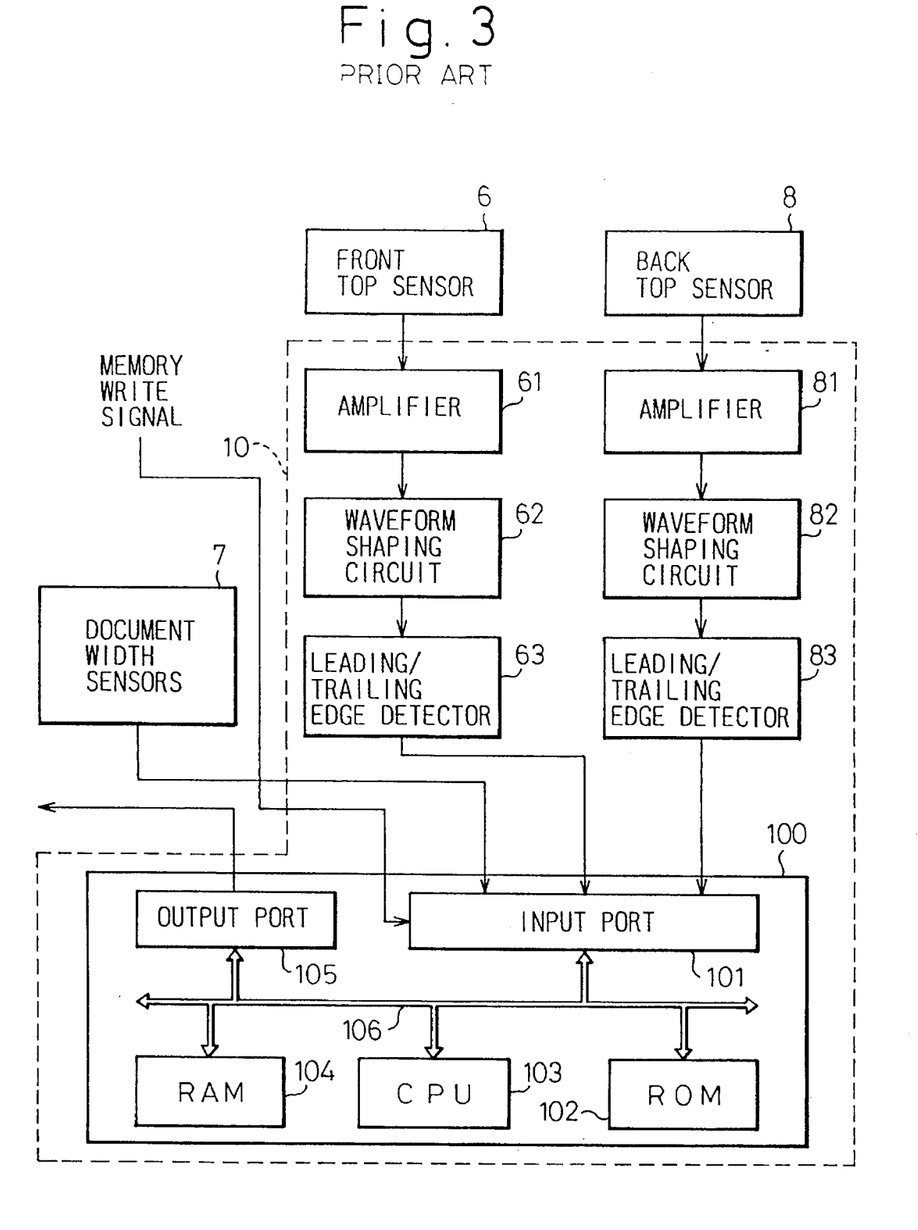
FIG. 3 is a block circuit diagram showing a control circuit in the conventional reading apparatus.

FIG. 3 is a block circuit diagram showing the configuration of a control circuit 10 in the reading apparatus 70 having the components shown in FIG. 2A. The control circuit 10 includes an amplifier 61 for amplifying an output of the front top sensor 6, a waveform shaping circuit 62 for reshaping a waveform of the amplified output signal, a leading/trailing edge detector 63 for detecting the leading and trailing edges of a document by analyzing a reshaped waveform, an amplifier 81 for amplifying an output of the back top sensor 8, a waveform shaping circuit 82 for reshaping a waveform of an amplified output signal, a leading/trailing edge detector 83 for detecting leading and trailing edges of a document by analyzing a reshaped waveform, and a microcomputer 100. The microcomputer 100 has an input port 101, a central processing unit (CPU) 102, a read only memory (ROM) 103, a random access memory (RAM) 104, and an output port 105, which are interconnected by a bus 106. Outputs of the document width sensors 7 and the leading/trailing detectors 63 and 83 are fed to the input port 101 of the microcomputer 100.

Next, the operations of the conventional reading apparatus 70 will be described. First, the document 5 is inserted into the document carrier mechanism 3 in the arrow direction. At this time, the document 5 is inserted into the carrier path 33 of the document carrier mechanism 3 with the front F faced down and the back B faced up. The document 5 is fed to the front data reader 1 by the document carrier mechanism 3, and then fed to the back reader 2.

When the document 5 passes through the front data reader 1, an image on the surface F of the document 5 is read line by line. When the document passes through the back reader 2, an image on the back thereof is read line by line.

The front top sensor 6 and back top sensor 8 detect the leading and trailing edges of the document 5. When the front top sensor 6 detects the leading edge of the document 5, printed image data is read from the front of the document 5. When the front top sensor 6 detects the trailing edge of the document 5, reading of the front of document 5 terminates. Similarly, when the back top sensor 8 detects the leading edge of the document 5, printed image data is read from the back of the document 5. When the back top sensor 6 detects the trailing edge of the document 5, reading of the back of document 5 terminates.

In the foregoing conventional reading apparatus 70, the front top sensor 6 and back top sensor 8 for detecting the leading and trailing edges of the document 5 may malfunction due to dust and dirt deteriorating the detecting efficiency. This may result in unstable detection of the trailing edge of the document 5. When trailing edge detection for the document 5 becomes unstable, although the trailing edge of a document has not passed through the top sensor, it is determined that the trailing edge has passed. This causes the image scanner to stop reading image data. Consequently, read data is missed.

Now, the configuration of a reading apparatus 20 as an embodiment of the present invention will be described. The reading apparatus 20 of the present invention has the same appearance as the conventional reading apparatus 70 shown in FIG. 1. However, the reading apparatus 20 differs from the conventional reading apparatus 70 in terms of the components of the ADF 72. The difference in components will be described in conjunction with FIGS. 4A, 4B, and 5.

Figures 4A, 4B:
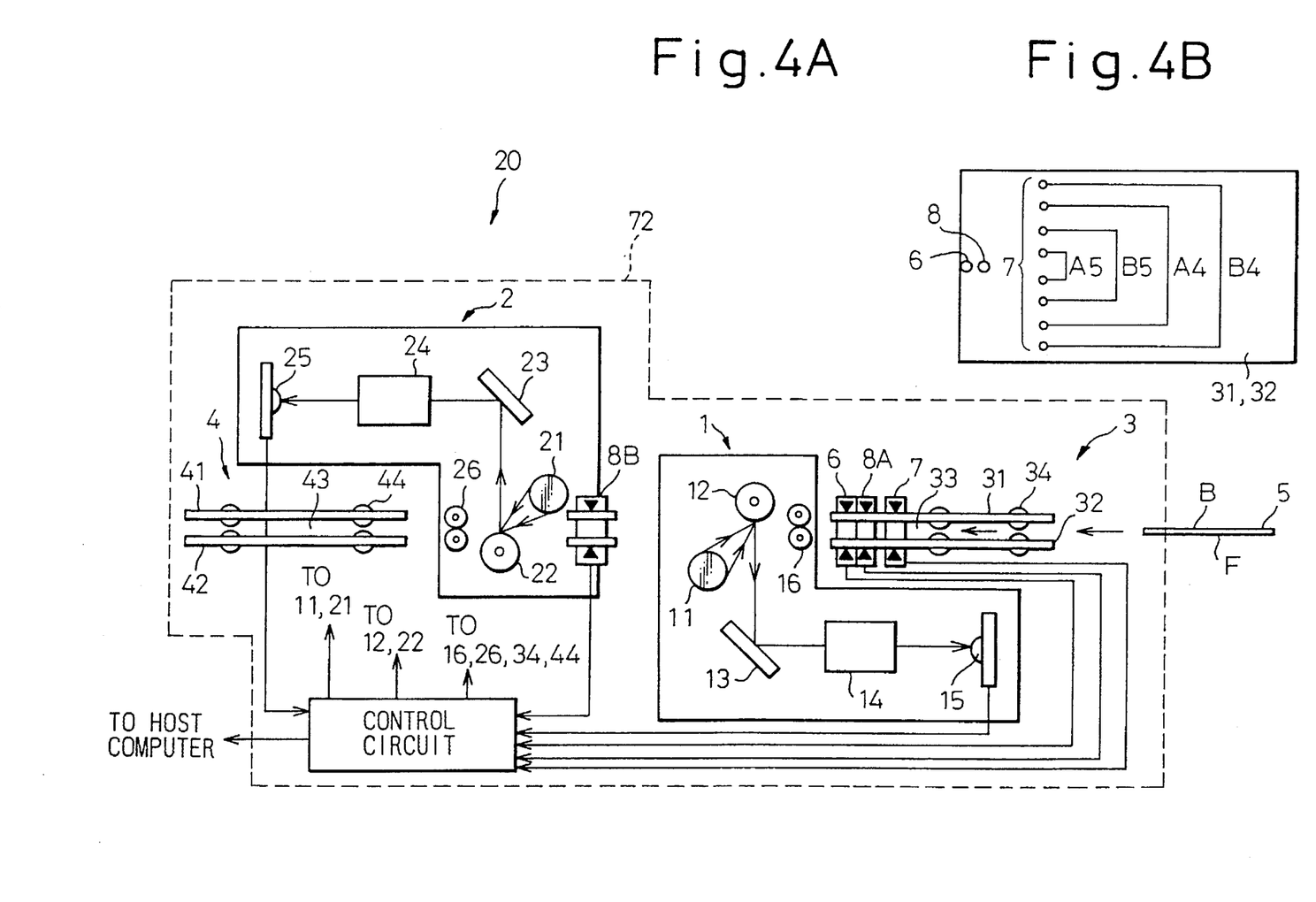
FIG. 4A is a block diagram showing components incorporated in a reading apparatus of an embodiment of the present invention.
FIG. 4B is a plan view showing an example of a layout of document size sensors in the reading apparatus shown in FIG. 4A.

FIG. 4A is a block diagram showing components of the reading apparatus 20 as an embodiment of the present invention. Even in the present invention, the ADF 72 has a front data reader 1 for reading the front of a document 5, a back data reader 2 for reading the back of the document 5, a document carrier mechanism 3 for carrying the document 5 to the front data reader 1, a document carrier mechanism 4 for carrying the document 5 from the back data reader 2 to a stacker 73, and a control circuit 10 for controlling these components. The arrow in FIG. 4A indicates the carrying direction of the document 5 in the document carrier path 33.

The front data reader 1 comprises a lamp 11 for illuminating the surface F of the incoming document 5, a platen 12 for supporting the incoming document 5 so that the document 5 can be illuminated by the lamp 11, a mirror 13 for changing the optical path of light reflected from the passing document 5 supported by the platen 12, a lens 14 for converging the light reflected from the mirror 13, and a CCD line sensor 15 for detecting light converged by the lens 14 and producing an electric signal representing an image on the document 5.

The back data reader 2 comprises a lamp 21 for illuminating the back B of the incoming document 5, a platen 22 for supporting the incoming document 5 so that the document 5 can be illuminated by the lamp 21, a mirror 23 for changing the optical path of light reflected from the passing document 5 supported by the platen 22, a lens 24 for converging light reflected from the mirror 23, and a CCD line sensor 25 for detecting light converged by the lens 24 and producing an electric signal representing an image on the document 5.

The document carrier mechanism 3 or 4 has two guide plates 31 and 32 or 41 and 42. The carrier path 33 or 43 is defined by the two guide plates 31 and 32 or 41 and 42. The document carrier path 33 or 43 has the roller 34 or 44 for feeding the document 5. In the document carrier mechanism 3 having these components and carrying the document 5 in this embodiment, document width sensors 7 for detecting the width of the document 5, a first back top sensor 8A for detecting the leading and trailing edges of the document 5, and a front top sensor 7 for detecting the leading and trailing edges of the document 5 are arranged in that order. A second back top sensor 8B is placed at the entrance of the back data reader 2 so as to detect only the leading edge of the document 5. The reading apparatus 20 shown in FIG. 2A differs from the conventional reading apparatus 70 in the points that the conventional back top sensor is replaced with the first and second back top sensors 8A and 8B, and that the first back top sensor 8A is located in the vicinity of the front top sensor 6.

The document width sensors 7 are, as shown in FIG. 4B, placed side by side transversely or perpendicularly to the the document carrier path 33 through which the document is carried. The document width sensors 7 detect the width of a document as pairs. For example, when a pair of the sensors 7 located at innermost positions are blocked with a document, the document size is recognized as A5. When all the sensors 7 are blocked with a document, the document size is recognized as B4.

In the reading apparatus 20 having the foregoing components, the document 5 is carried into the document carrier mechanism in the direction of the arrow. The document 5 passes through the carrier path 33 with the surface F face down and the back B face up. The document 5 is fed to the front data reader 1 by the document carrier mechanism 3, and then to the back data reader 2. When the document passes through the front data reader 1, an image on the front of the document 5 is read line by line. When the document passes through the back reader 2, an image on the back thereof is read line by line.

The front top sensor 6 and first back top sensor 8A detect the leading and trailing edges of the document 5. When the front top sensor 6 detects the leading edge of the document 5, printed image data is read from the front of the document 5. When the front top sensor 6 detects the trailing edge of the document 5, front reading for the document 5 terminates. As for the back of the document, the first back top sensor 8A predetects the size of the document 5. When the second back top sensor 8B detects the leading edge of the document, printed image data is read from the back of the document 5. The second back top sensor 8B does not detect the trailing edge of the document 5. Reading the back of document 5 is terminated according to the size of the document 5 detected by the front top sensor 6 and first back top sensor 8A and determined by the control circuit 10.

Figure 5:
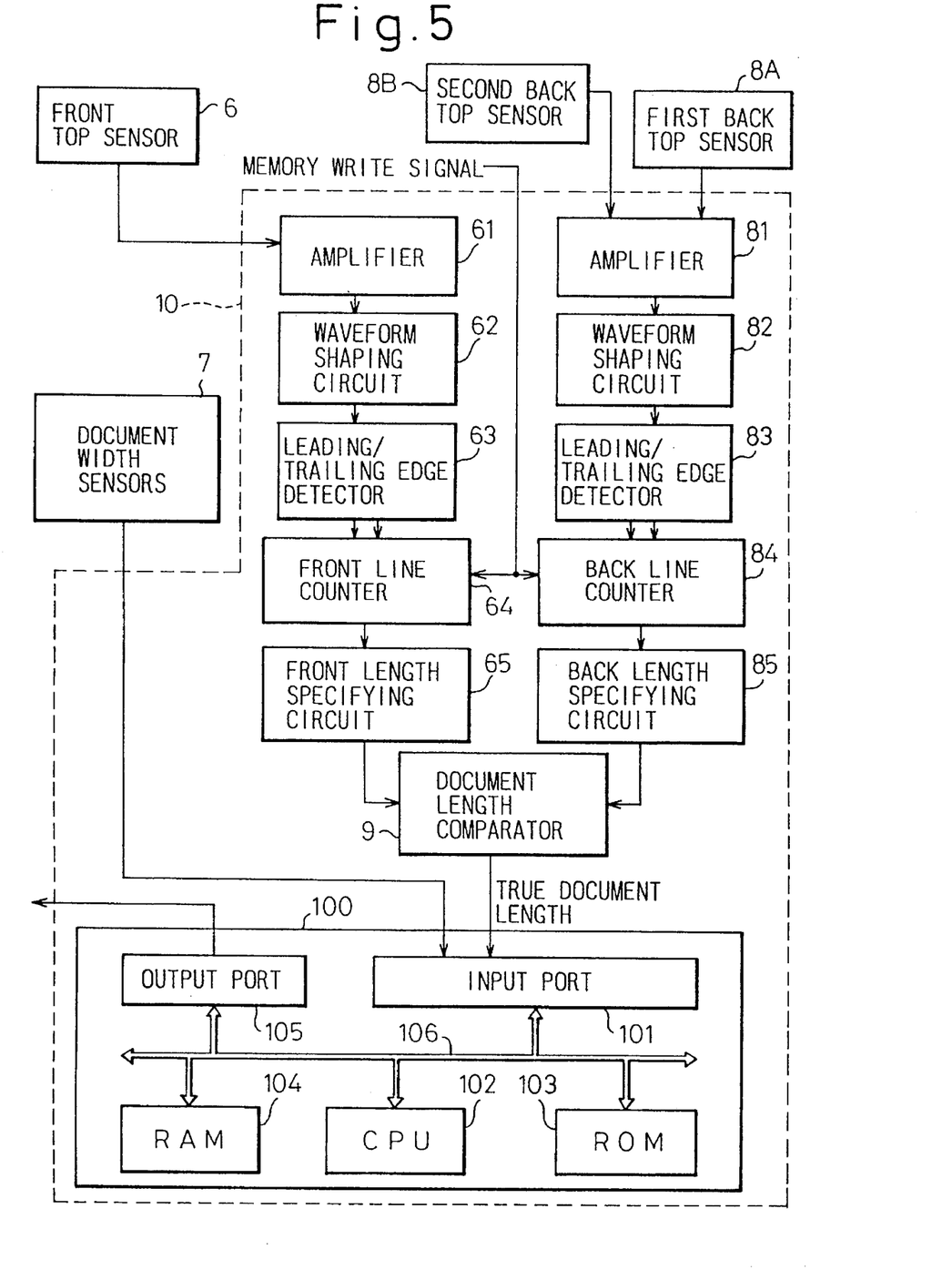
FIG. 5 is a block circuit diagram showing a control circuit in a reading apparatus of the present invention.

FIG. 5 is a block circuit diagram showing a configuration of an embodiment of the control circuit 10 in the reading apparatus 20 having the components shown in FIG. 4A. The control circuit 10 is connected to the front top sensor 6, document width sensors 7, first back top sensor 8A, and second back top sensor 8B. The microcomputer 100 is incorporated in the control circuit 10. The microcomputer 10 has an input port 101, a CPU 102, a ROM 13, a RAM 104, and an output port 105 which are interconnected by the bus 106.

The control circuit 10 includes amplifiers 61 and 81 for amplifying the outputs of the front top sensor 6 and the first back top sensor 8A, waveform shaping circuits 62 and 82 for reshaping amplified waveforms, leading/trailing edge detectors 63 and 83 for detecting the leading and trailing edges of a document by analyzing the reshaped waveforms, front line (or raster) counters 64 and 84 for counting the number of front lines (or rasters) in response to a Start or Stop signal sent from the leading/trailing edge detectors 63 and 83, front length specifying circuit 65 and back length specifying circuit 85 for specifying the lengths of the front and back of a document by analyzing the outputs of the front line counters 64 and 84, and a document length comparator 9 for comparing between the lengths of the front and back of a document by analyzing the outputs of the front length specifying circuit 65 and back length specifying circuit 85. The front line counters 64 and 84 input a Memory Write signal. A signal sent from the document length comparator 9 is fed to the input port 101 in the microcomputer 100. The input port 101 also inputs signals from the document width sensors 7 and second back top sensor 8B.

Next, the actions of the circuit elements shown in the block circuit diagram of FIG. 5 will be described in conjunction with the waveforms shown in FIGS. 6A to 6I.

Figure 6A:
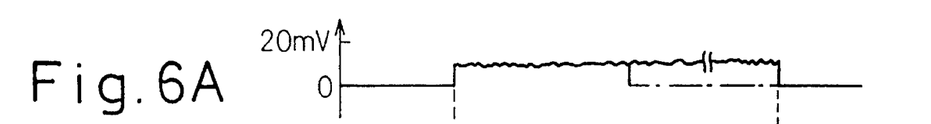
FIGS. 6A to 6I show waveforms of outputs of circuit elements shown in the block circuit diagram of FIG. 5.

A solid line in FIG. 6A indicates a waveform of a signal provided by the front top sensor 6. The signal provided by the front top sensor 6 has a low level and contains a noise. A signal provided by the first back top sensor 8A has the same waveform as the one shown in FIG. 6A.

Figure 6B:
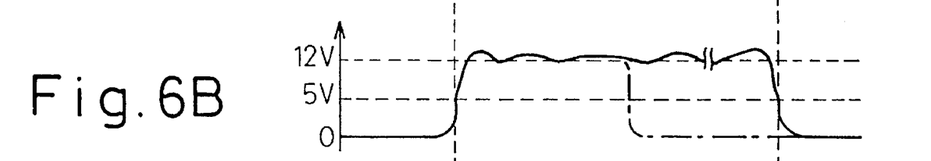

A solid line in FIG. 6B indicates a waveform of an output of the amplifier 61. The amplifier 61 amplifies the signal provided by the front top sensor 6 so that the signal will rise to about 12 V. The amplified signal still contains a noise. The signal provided by the amplifier 81 has the same waveform as the one shown in FIG. 6B.

Figure 6C:
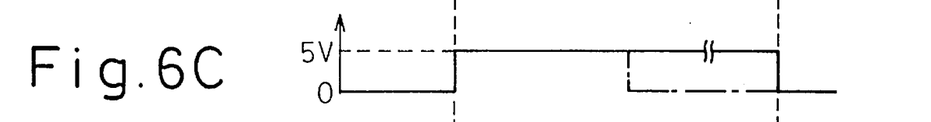

A solid line in FIG. 6C indicates a waveform of an output of the waveform shaping circuit 62. The waveform shaping circuit 62 cuts off a noise shown in FIG. 6B from an analog signal of 12 V and provides a digital signal of 5 V. The signal provided by the waveform shaping circuit 82 has the same waveform as the one shown in FIG. 6C.

Figure 6D:
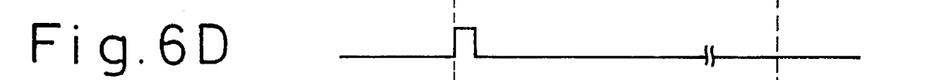
Figure 6E:
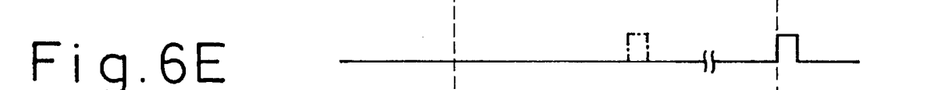

Solid lines in FIGS. 6D and 6E indicate waveforms of outputs of the leading/trailing edge detector 63. The leading/trailing edge detector 63 comprises a leading edge detector and a trailing edge detector. The leading edge detector detects the leading edge of a signal reshaped by the waveform shaping circuit 62, and outputs a Start signal, shown in FIG. 6D, to the front line counter 64. The trailing edge detector detects the trailing edge of a signal reshaped by the waveform shaping circuit 62, and outputs a Stop signal, shown in FIG. 6E, to the front line counter 64. The signals provided by the leading/trailing edge detector 83 have the same waveforms as the ones shown in FIGS. 6D and 6E.

Figure 6F:
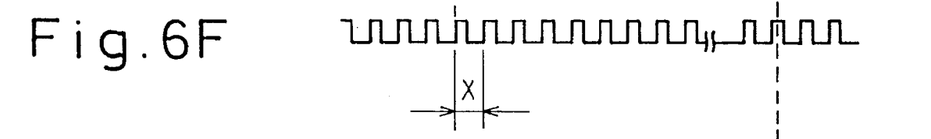

FIG. 6F shows a Memory Write signal to be fed to the front line counter 64. In response to a Start signal sent from the leading/trailing edge detector 63, the front line counter 64 starts counting pulses from the Memory Write signal. When a Stop signal occurs, the front line counter 64 stops counting the pulses thereof. A pulse spacing X of the Memory Write signal corresponds to a time interval during which one line is written. By counting the number of pulses of the Memory Write signal, the number of lines read is found. That is to say, by counting the number of pulses of the Memory Write signal during a time interval starting with the Start signal (FIG. 6D) and ending with the Stop signal (FIG. 6E), the number of lines between the leading edge of a document to the trailing edge thereof is counted. The number of lines is used to recognize the length of a document. The Memory Write signal is also fed to the back line counter 84.

Figure 6G:
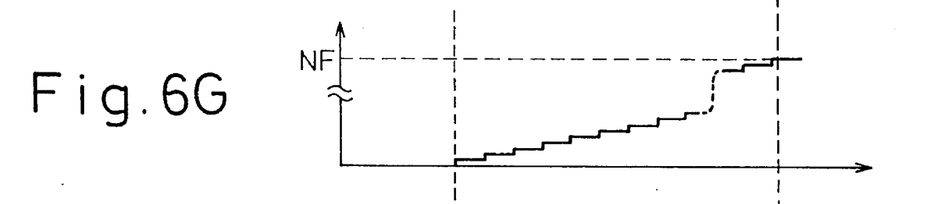

FIG. 6G shows values counted up by the front line counter 64. As long as the front top sensor 6 is normal, the count in the front line counter 64 gets larger during a period of time from the input of the Start signal to the input of the Stop signal. The count assumes a value NF when the Stop signal occurs. The front length specifying circuit 65 specifies a length of a front of a document by analyzing the count value NF provided by the front line counter 64. When the first back top sensor 8A operates normally, the back line counter 84 counts up values as shown in FIG. 6G.

Outputs of the front length specifying circuit 65 and back length specifying circuit 85 are fed to the document length comparator 9. The document length comparator 9 selects a larger one from the lengths provided by the front length specifying circuit 65 and back length specifying circuit 85, and outputs the selected length as a true document length to the input port 101 of the microcomputer 100.

Figure 6H:
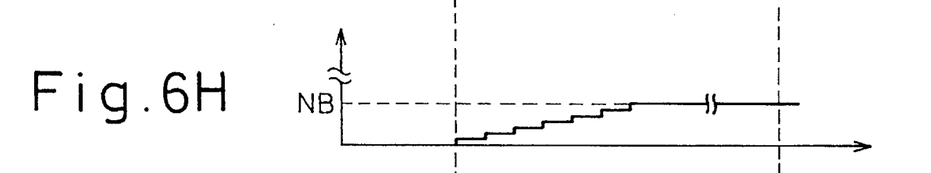

Assume that the first back top sensor 8A malfunctions and suspends outputting in the middle of the document 5 as indicated by the dot and dash line. In this case, the outputs of the amplifier 81 and waveform shaping circuit 82 become as indicated with dot and dash lines in FIGS. 6B and 6C. As indicated with a dot and dash line in FIG. 6E, a Stop signal is supplied in the middle of a document. The back line counter 84 stops counting up with a value NB (NB<NF) as shown in FIG. 6H. The document length comparator 9 accepts a length derived from the count value NF representing the number of lines (or rasters) from the front length specifying circuit 65, and also accepts a length smaller than an actual one derived from the count value NB representing the number of lines from the back length specifying circuit 85.

Figure 6I:
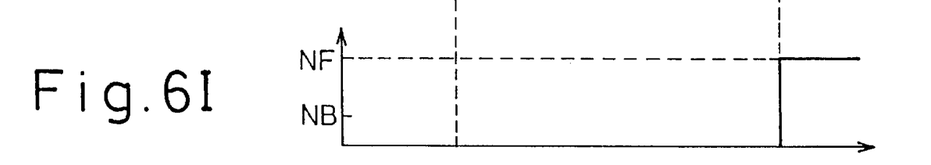

The document length comparator 9 selects the larger length (derived from the number of lines NF) from the lengths provided by the front length specifying circuit 65 and back length specifying circuit 85, and outputs the selected length as a true document length to the input port 101 of the microcomputer 100 as shown in FIG. 6I.

The probability that both the front top sensor 6 and back top sensor 8A malfunction at the same time is very low. When either of the top sensors malfunctions, the length detected by the front top sensor 6 is compared with the length detected by the first back top sensor 8A, and then a larger length is adopted. Thus, the true document length can be identified.

Figure 7:
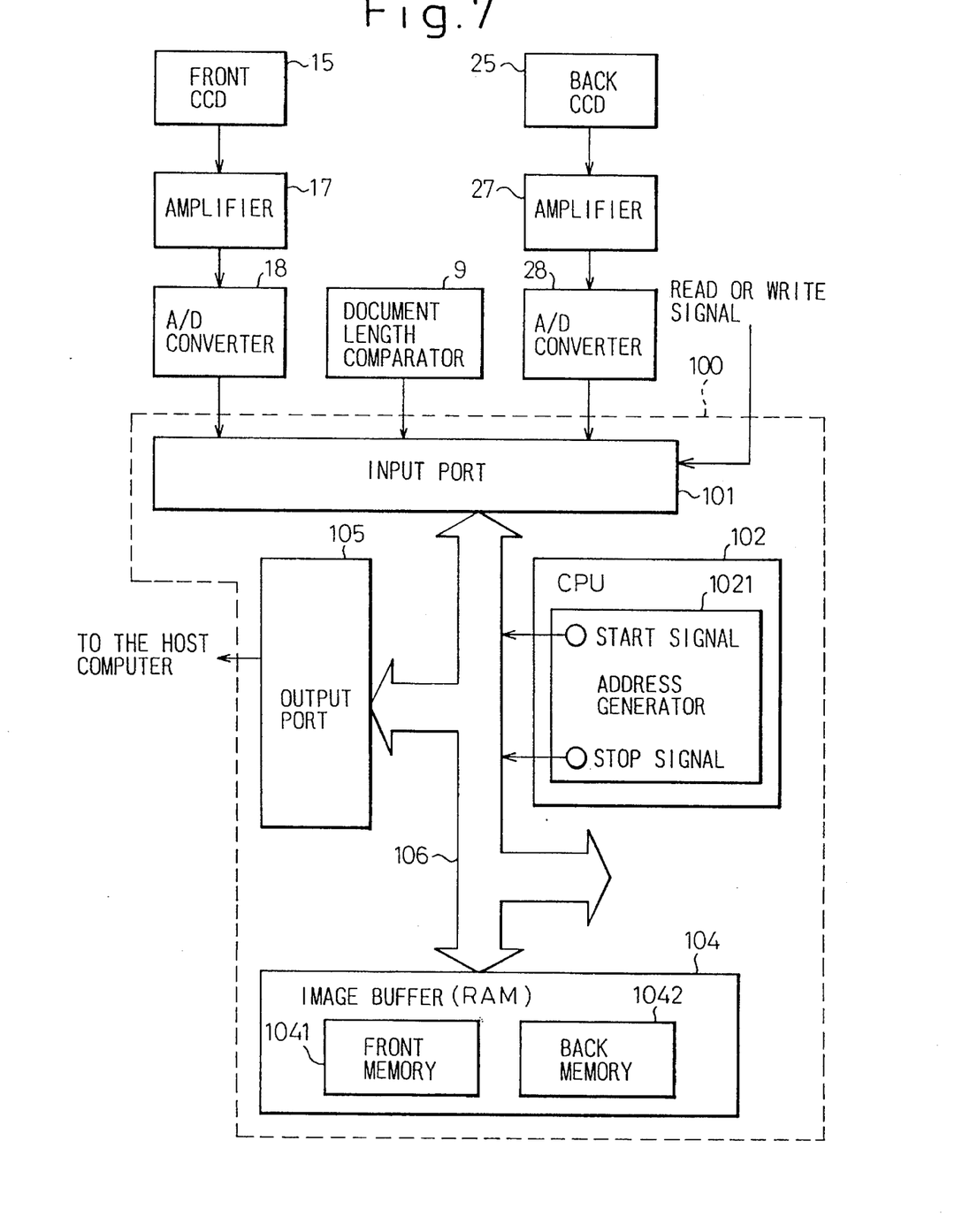
FIG. 7 is a block circuit diagram showing a document image data reading/storing system incorporated in a reading apparatus of the present invention.

FIG. 7 is a block circuit diagram showing a reading/storing system for reading and storing image data acquired from a document in the reading apparatus 20 of the present invention. An output from the front CCD 15 shown in FIG. 4A is amplified by an amplifier 17, and converted into a digital signal by an A/D converter 18, and fed to the input port 101. Likewise, an output from the back CCD 25 is amplified by an amplifier 27, converted into a digital signal by an A/D converter, and fed to the input port 101. The CCDs 15 and 25 continue reading operation until the true document length is identified.

A signal representing a true document length determined by the document length comparator 9 as described previously is fed to an address generator 1021 in the CPU 102 of the microcomputer 100. The address generator 1021 analyzes the signal representing a document length so as to determine a data storage area, defined by start and edge addresses in each of a front memory 1041 and a back memory 1042 in an image buffer (RAM) 104.

The read data which have been read by the front CCDs 15 and 25 and converted into a digital signal by the A/D converters 18 and 28 are stored sequentially in the storage areas in the image buffer 104 defined by the address generator 1021 in response to a Write signal.

After back reading terminates, the data stored in the image buffer 104 are read in response to a Read signal. During the reading, data are read sequentially from addresses designated by the address generator 102 in the front memory 1041, and fed to an external unit such as a host computer via the output port 105.

As mentioned above, according to the present invention, the length detected by the front top sensor 6 is compared with the length detected by the first back top sensor 8A. Even if the efficiency of detecting a leading or trailing edge of a document deteriorates or an error occurs in detecting a leading or trailing edge, since a larger one of detected lengths is adopted as a document length, missing image data can be avoided.

In the aforesaid embodiment, as shown in FIG. 5, the control circuit 10 includes the front line counter 64, front length specifying circuit 65, back line counter 84, back length specifying circuit 85, and document length comparator 9. When programs stored in the ROM 103 in the microcomputer 100 are modified, the control circuit having the circuit elements shown in FIG. 3 allows the CPU 102 to compare the lengths.

Figure 8:
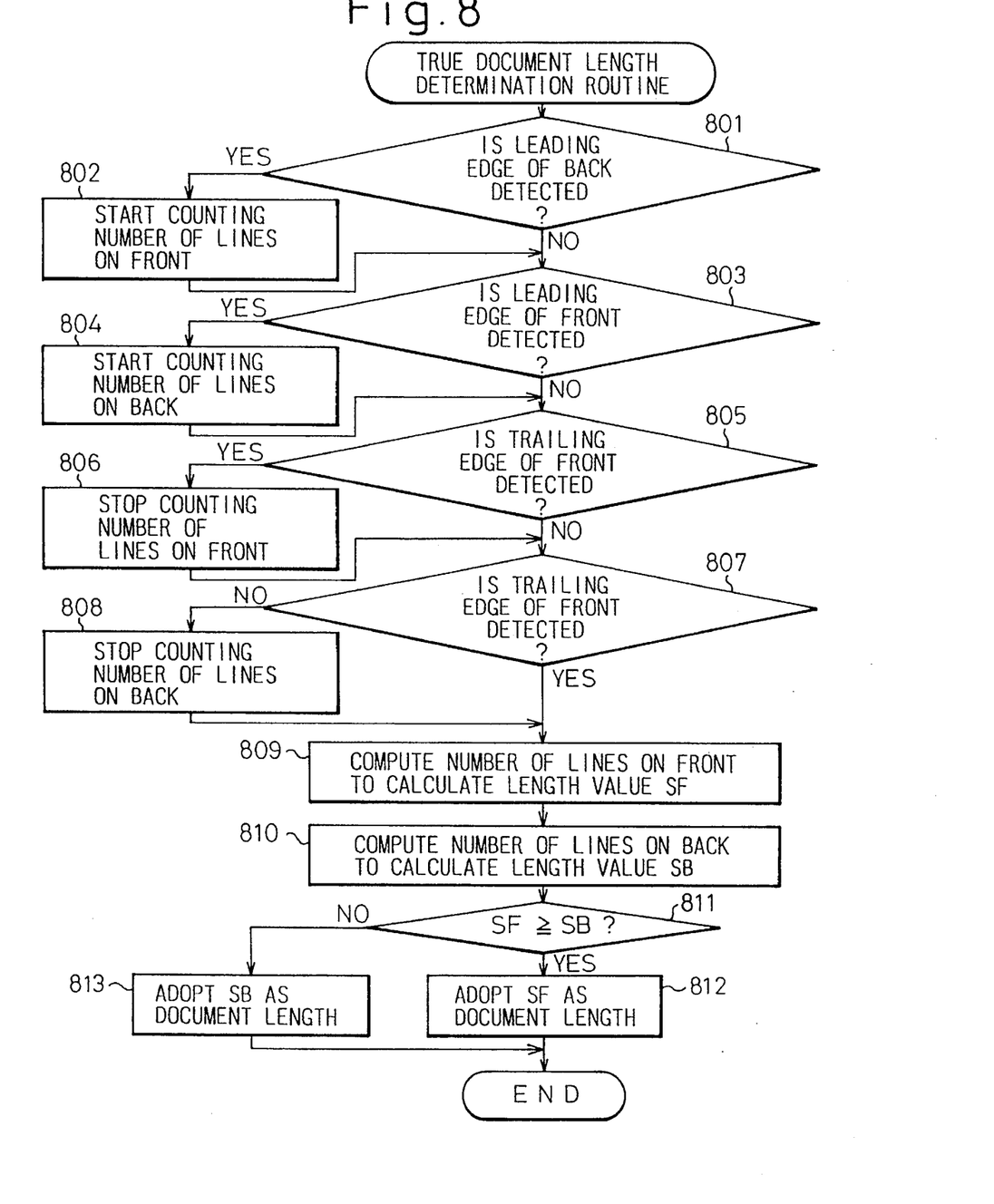
FIG. 8 is a flowchart showing a routine of determining a true document size to be used by a control circuit in a reading apparatus which has the configuration shown in FIGS. 2A and 2B and in which the present invention is implemented.

FIG. 8 is a flowchart showing a routine in another embodiment of the present invention, wherein the control circuit 10 allows the CPU 102 to determine the true document length.

In this embodiment, at step 801, an output of the leading/trailing edge detector 63 is analyzed to determine whether the leading edge of a front of a document is detected. When the leading edge of a front is detected, the control starts, at step 802, to count the number of lines on the front. At step 803, an output of the leading/trailing edge detector 83 is analyzed to determine whether the leading edge of a back of a document is detected. When the leading edge of a back is detected, the control starts, at step 804, to count the number of lines on the back.

Thereafter, at step 805, an output of the leading/trailing edge detector 63 is analyzed to determine whether the trailing edge of a front of a document is detected. When the trailing edge of a front is detected, it is stopped at step 806 to count the number of lines in the front. At step 807, an output of the leading/trailing edge detector 83 is analyzed to determine whether the trailing edge of a back is detected. When the trailing edge of a back is detected, the control stops, at step 808, to count the number of lines on the back.

At step 609, the number of lines on the front of a document is computed to obtain a length value SF of the front. At step 610, the number of lines on the back thereof is computed to obtain a length value SB.

At step 611, the value SF of the length of the front of a document is compared with the value SB of the length of the back thereof. When the value SF is equal to or larger than the value SB, the control is passed to step 612. The value SF is then adopted as the true document length. When the value SF is smaller than the value SB, the control is passed to step 613. The value SB is then adopted as the true document length.

Even in this embodiment, the length detected by the front top sensor 6 is compared with the one detected by the first back top sensor 8A. Even if the efficiency of detecting a leading or trailing edge of a document deteriorates or an error occurs in detecting a leading or trailing edge, since a larger one of detected lengths is adopted as the document length, missing image data is avoided.

Figures 9A, 9B:
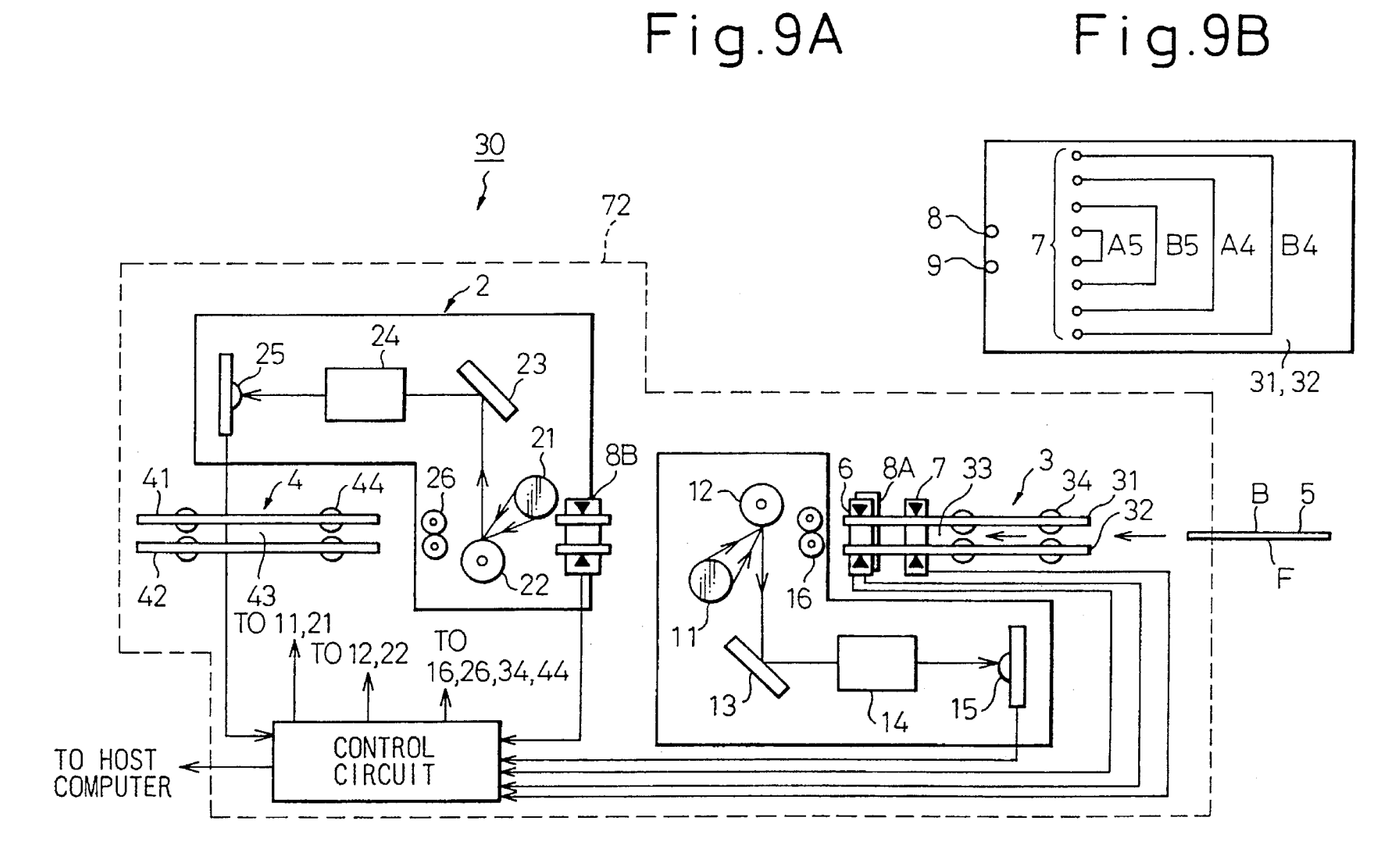
FIG. 9A is a block diagram showing components of a reading apparatus of another embodiment of the present invention.
FIG. 9B is a plan view showing an example of a layout of document size sensors in the reading apparatus shown in FIG. 9A.

FIGS. 9A and 9B are block diagrams showing components of a reading apparatus 30 as another embodiment of the present invention. The components of the reading apparatus 30 are substantially identical to those in the embodiment shown in FIGS. 4A and 4B except that the front top sensor 6 and first back top sensor 8A are placed different positions. Identical component members are assigned the same reference numerals, of which descriptions will be omitted.

In the reading apparatus 20 of the embodiment shown in FIGS. 4A and 4B, the front top sensor 6 and first back top sensor 8A are placed in series along the path for carrying the document 5. By contrast, in the reading apparatus 30 of the embodiment shown in FIGS. 9A and 9B, the front top sensor 6 and first back top sensor 8A are placed side by side across the path for carrying the document 5. This is the difference between the reading apparatuses 20 and 30. The operations and advantages of the reading apparatus 30 of this embodiment are identical to those of the reading apparatus 20 shown in FIGS. 4A and 4B.

The present invention can be implemented in the conventional reading apparatus 70 shown in FIGS. 2A and 2B by modifying the circuit elements of the control circuit 10 as shown in FIG. 5.

The operations of the conventional reading apparatus 70 having the circuit elements shown in FIG. 5 will be described below.

Described first is how the reading apparatus 70 operates when the back top sensor 8 malfunctions. If the back top sensor 8 malfunctions, (1) after front reading starts and then back reading starts, before front reading terminates, a Stop signal is input to stop back reading. Alternatively, (2) after front reading terminates, before back reading is completed over a length detected by the front top sensor 6, a Stop signal is input to stop back reading. In the case of (1), since front reading has not terminated, back reading continues.

In the case of (1), when front reading terminates, the lengths derived from the leading and trailing edges detected by the top sensors 6 and 8 are compared with each other. In the case of (2), when a stop signal is input to stop back reading, the lengths derived therefrom are compared with each other. In either case, the larger one of the resultant lengths is adopted as the document length. The back of the document is read over the document length. Read data are stored in the front memory 1041 and back memory 1042 in the image buffer 104.

Described next is how the reading apparatus 70 operates when the front top sensor 6 malfunctions. In this case, front reading continues until back reading terminates. When back reading terminates, the lengths resulting from the detection by the front and back top sensors 6 and 8 are compared with each other. The larger one of the resultant lengths is adopted as the document length. Based on the document length, excessive front read data or back read data is cut out.

What is claimed is:

1. A reading apparatus serving as an input means for simultaneously reading printed image information from the front and back of a document, converting the read image information into digital data, and storing the digital data on a data recording medium, comprising:

document carrier means for carrying documents, inserted into a slot, through said apparatus and for ejecting said documents through an outlet;

a front reading means/or reading a printed image from said front of a document;

a back reading means for reading a printed image from said back of a document;

a front size determining means lying in a document carrier path and detecting the size of said front of a document by detecting a leading and trailing edge of said document;

a back size determining means lying in said document carrier path and detecting the size of said back of a document;

a document size comparing means for comparing between the sizes determined by said front size determining means and back size determining means, and outputting a larger one of determined sizes as a document size; and a reading control means allowing said front reading means and back reading means to read printed image information from said document according to said document size provided by said document size comparing means.

2. A reading apparatus as set forth in claim 1, wherein said front size determining means is located in an upstream direction, which is in a forward position of said document carrier path, of said front reading means in said document carrier path; and said back size determining means is located upstream of said front reading means in said document carrier path.

3. A reading apparatus as set forth in claim 2, wherein said front size determining means and back size determining means are placed in line along to a document carrying direction of said document carrier path.

4. A reading apparatus as set forth in claim 2, wherein said front size determining means and back size determining means are placed side by side across a document carrying direction of said document carrier path.

5. A reading apparatus as set forth in claim 2, wherein a leading edge detecting means for detecting a leading edge of a document is placed at a document approaching side of said back reading means.

6. A reading apparatus as set forth in claim 1, further comprising document width determining means placed in line across a document carrying direction of said document carrier path.

* * * * *